United States Patent
Prosser et al.

(10) Patent No.: US 10,808,967 B2
(45) Date of Patent: Oct. 20, 2020

(54) REFRIGERATION CYCLE FOR LIQUID OXYGEN DENSIFICATION

(71) Applicants: Neil M. Prosser, Lockport, NY (US); James R. Dray, Buffalo, NY (US); Paul W. Belanger, Clarence Center, NY (US); Maulik R. Shelat, Williamsville, NY (US)

(72) Inventors: Neil M. Prosser, Lockport, NY (US); James R. Dray, Buffalo, NY (US); Paul W. Belanger, Clarence Center, NY (US); Maulik R. Shelat, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 249 days.

(21) Appl. No.: 15/871,361

(22) Filed: Jan. 15, 2018

(65) Prior Publication Data
US 2018/0202690 A1 Jul. 19, 2018

Related U.S. Application Data

(60) Provisional application No. 62/446,586, filed on Jan. 16, 2017.

(51) Int. Cl.
*F25B 9/02* (2006.01)
*F25B 9/10* (2006.01)
(Continued)

(52) U.S. Cl.
CPC ............... *F25B 9/02* (2013.01); *B64G 1/402* (2013.01); *F25B 9/10* (2013.01); *F25B 25/005* (2013.01); *F25B 40/00* (2013.01); *F25J 1/005* (2013.01); *F25J 1/0017* (2013.01); *F25J 1/0052* (2013.01); *F25J 1/0057* (2013.01); *F25J 1/0062* (2013.01); *F25J 1/0065* (2013.01); *F25J 1/0097* (2013.01); *F25J 1/0244* (2013.01); *F25J 1/0254* (2013.01);
(Continued)

(58) Field of Classification Search
CPC ...... F25B 9/02; F25B 40/00; F25B 2309/022; F25J 1/0062; F25J 1/0065; F25J 1/0292; F25J 1/0244; F25J 1/0017; F25J 1/005; F25J 1/0057; F25J 2240/40; F25J 2290/34; F25J 2210/42; F25J 2270/904; F17C 2223/0169
See application file for complete search history.

(56) References Cited

U.S. PATENT DOCUMENTS 3,194,026 A * 7/1965 La Fleur ............... F25J 1/0012
62/88
3,377,811 A * 4/1968 Siegrist .................. F25J 1/0007
62/608

(Continued)

FOREIGN PATENT DOCUMENTS

| EP | 2 975 337 A1 | 1/2016 |
|---|---|---|
| WO | WO 2013/154185 A1 | 10/2013 |
| WO | WO 2016/178272 A1 | 11/2016 |

*Primary Examiner* — Kun Kai Ma
(74) *Attorney, Agent, or Firm* — Robert J. Hampsch (57) ABSTRACT

Closed-loop refrigeration cycles for liquid oxygen densification are disclosed. The disclosed refrigeration cycles may be turbine-based refrigeration cycles or a Joule-Thompson (JT) expansion valve based refrigeration cycles and include a refrigerant or working fluid comprising a mixture of neon or helium together with nitrogen and/or oxygen.

9 Claims, 4 Drawing Sheets

(51) Int. Cl.
*F25J 1/00* (2006.01)
*F25J 1/02* (2006.01)
*F25B 25/00* (2006.01)
*B64G 1/40* (2006.01)
*F25B 40/00* (2006.01)
*F02K 9/42* (2006.01)

(52) U.S. Cl.
CPC ........... *F25J 1/0268* (2013.01); *F25J 1/0275* (2013.01); *F25J 1/0292* (2013.01); *F02K 9/425* (2013.01); *F17C 2223/0169* (2013.01); *F25B 2309/022* (2013.01); *F25J 2210/42* (2013.01); *F25J 2240/02* (2013.01); *F25J 2240/40* (2013.01); *F25J 2270/904* (2013.01); *F25J 2290/34* (2013.01)

(56) References Cited

U.S. PATENT DOCUMENTS

| | | | | |
|---|---|---|---|---|
| 3,527,059 | A | * | 9/1970 | Rust ................. F25J 1/0022 62/115 |
| 3,735,600 | A | * | 5/1973 | Dowdell ............ F25J 1/0282 62/619 |
| 4,829,785 | A | * | 5/1989 | Hersey ................ F25B 9/02 62/335 |
| 5,295,358 | A | * | 3/1994 | Rockenfeller ..... F25B 17/083 62/106 |
| 5,644,920 | A | | 7/1997 | Lak et al. |
| 6,041,620 | A | * | 3/2000 | Olszewski ......... C09K 5/045 62/612 |
| 6,073,450 | A | | 6/2000 | Lak et al. |
| 6,076,372 | A | * | 6/2000 | Acharya ............ C09K 5/041 62/606 |
| 6,116,030 | A | | 9/2000 | Story |
| 6,131,395 | A | | 10/2000 | Greene et al. |
| 6,131,397 | A | | 10/2000 | Davis et al. |
| 6,151,900 | A | | 11/2000 | Lak et al. |
| 6,176,102 | B1 | * | 1/2001 | Novak ............... C09K 5/042 62/612 |
| 6,205,812 | B1 | * | 3/2001 | Acharya ............ F25B 9/006 62/607 |
| 6,293,106 | B1 | * | 9/2001 | Acharya ............ F25J 1/0097 62/3.1 |
| 6,354,087 | B1 | * | 3/2002 | Nakahara .......... F17C 13/02 62/6 |
| 6,374,617 | B1 | | 4/2002 | Bonaquist et al. |
| 6,438,994 | B1 | * | 8/2002 | Rashad ............. F25B 9/006 62/613 |
| 6,453,681 | B1 | | 9/2002 | Lak et al. |
| 6,532,750 | B1 | | 3/2003 | Hood |
| 6,591,632 | B1 | * | 7/2003 | Mahoney .......... F25J 1/0052 62/613 |
| 6,609,383 | B1 | | 8/2003 | Kusada et al. |
| 6,968,704 | B2 | | 11/2005 | Hood |
| 7,043,925 | B2 | | 5/2006 | Haberbusch |
| 7,347,053 | B1 | | 3/2008 | Haberbusch et al. |
| 8,578,734 | B2 | * | 11/2013 | Jager ................. F25J 1/0042 62/611 |
| 2003/0000213 | A1 | * | 1/2003 | Christensen ....... F01B 25/08 60/670 |
| 2005/0253107 | A1 | * | 11/2005 | Flynn ................. C09K 5/041 252/67 |
| 2010/0326097 | A1 | | 12/2010 | Nguyen et al. |
| 2017/0244120 | A1 | * | 8/2017 | Holladay ........... F25B 21/00 |
| 2019/0161661 | A1 | * | 5/2019 | Tasaka .............. C09K 5/045 |

* cited by examiner

REFRIGERATION CYCLE FOR LIQUID OXYGEN DENSIFICATION

CROSS REFERENCE TO RELATED APPLICATIONS

The present application claims priority from U.S. Provisional Patent Application Ser. No. 62/446,586 filed on Jan. 16, 2017, the disclosure of which is incorporated by reference herein.

TECHNICAL FIELD

The present invention is related to cryogenic refrigeration cycles for propellant densification, and more particularly to systems and methods for densifying liquid oxygen using a closed-loop refrigeration circuit that includes a refrigerant or working fluid comprising a mixture of neon or helium together with nitrogen and/or oxygen.

BACKGROUND

Cryogenic refrigeration systems have been used for decades in many rocket or space applications for purposes such as liquefaction, propellant subcooling (i.e. thermal control), propellant densification and to prevent propellant boil off (i.e. conserve propellant). For propellant densification, the removal of sensible heat from a liquid propellant, such as liquid oxygen, increases the density of the liquid propellant, which is solely dependent on temperature since liquids are generally considered incompressible. Challenges facing the space industry related to propellant densification include reducing the operational and capital cost of propellant densification as well as reducing the time it takes to achieve the desired temperatures.

As a result of these challenges, there is a continuing need to develop improved refrigeration cycles for densification of propellants, such as liquid oxygen.

SUMMARY OF THE INVENTION

The present invention may be characterized as a closed-loop Joule-Thompson (JT) expansion valve based refrigeration system for liquid oxygen densification comprising: (i) a compressor having an inlet and an outlet and configured to receive a working fluid at the inlet and compress the working fluid at a pressure ratio between the inlet and outlet of between 10.0 and 25.0; (ii) a heat exchanger in fluid communication with the outlet of the compressor configured to receive the compressed working fluid and cool the compressed working fluid via indirect heat exchange with a gaseous nitrogen stream or a liquid nitrogen stream or both to produce a cold, compressed working fluid; (iii) a JT expansion valve in fluid communication with the heat exchanger and configured to expand the cold, compressed working fluid and produce a refrigeration stream of expanded working fluid; (iv) an oxygen chiller in fluid communication with the JT expansion valve, the oxygen chiller configured to receive a stream of liquid oxygen and the refrigeration stream from the JT expansion valve, and subcool the stream of liquid oxygen to a temperature less than 66.5 K, preferably less than 62.0 K, more preferably less than or equal to 60.9 K via indirect heat exchange with the refrigeration stream of expanded working fluid to produce a densified liquid oxygen stream; and (v) a recirculating conduit connecting the oxygen chiller with the heat exchanger and the inlet of the compressor, the recirculating conduit configured to recirculate the warmed refrigeration stream first to the heat exchanger where it further cools the compressed working fluid and then to the inlet of the compressor where the warmed refrigeration stream is compressed as the working fluid.

The present invention may also be characterized as a method of densifying a liquid oxygen stream in a closed-loop JT expansion valve based refrigeration cycle, the method comprising the steps of: (a) compressing a working fluid having between 70 mol % and 80 mol % neon or neon and helium and between 20 mol % and 30 mol % nitrogen and/or oxygen in a multistage compressor from a pressure just above ambient pressure to a pressure between about 150 psia and 380 psia; (b) cooling the compressed working fluid via indirect heat exchange with a cold gaseous nitrogen stream or a liquid nitrogen stream or both to produce a cold, compressed working fluid; (c) expanding the cold, compressed working fluid in a JT expansion valve to produce a refrigeration stream of expanded working fluid at a temperature less than 66.5 K, preferably less than 62.0 K, more preferably less than or equal to 60.9 K; (d) subcooling a stream of liquid oxygen via indirect heat exchange with the expanded working fluid to produce a densified liquid oxygen stream; and (e) recirculating the warmed refrigeration stream to the multi-stage compressor, wherein the warmed refrigeration stream is compressed as the working fluid to form a closed-loop refrigeration cycle.

Alternatively, the present invention may be characterized as a turbine based closed-loop refrigeration system for liquid oxygen densification comprising: (i) a compressor configured to compress a working fluid having between 85 mol % and 95 mol % neon and/or helium and between 5 mol % and 15 mol % nitrogen and/or oxygen from a pressure just above ambient pressure to a pressure between about 120 psia and 155 psia; (ii) a heat exchanger in fluid communication with the outlet of the compressor configured to receive the compressed working fluid and cool the compressed working fluid via indirect heat exchange with a gaseous nitrogen stream or a liquid nitrogen stream or both to produce a cold, compressed working fluid; (iii) a turbine in fluid communication with the heat exchanger and configured to expand the cold, compressed working fluid and produce a refrigeration stream of expanded working fluid; (iv) an oxygen cooler in fluid communication with the turbine, the oxygen cooler configured to receive a stream of liquid oxygen and the refrigeration stream from the turbine, and subcool the stream of liquid oxygen to a temperature less than 66.5 K, preferably less than 62.0 K, more preferably less than or equal to 60.9 K via indirect heat exchange with the refrigeration stream of expanded working fluid to produce a densified liquid oxygen stream; (v) a recirculating conduit configured to recirculate the warmed refrigeration stream to an inlet of the compressor where the warmed refrigeration stream is compressed as the working fluid.

Finally, the present invention may be characterized as a method of densifying a liquid oxygen stream in a closed-loop, turbine based refrigeration cycle, the method comprising the steps of: (a) compressing a working fluid having between about 85 mol % and about 95 mol % neon and/or helium and between about 5 mol % and about 15 mol % nitrogen and/or oxygen in a compressor from a pressure just above ambient pressure to a pressure between about 120 psia and 155 psia; (b) cooling the compressed working fluid via indirect heat exchange with a gaseous nitrogen stream or a liquid nitrogen stream or both to produce a cold, compressed working fluid; (c) expanding the cold, compressed working fluid in a turbine to produce a refrigeration stream of expanded working fluid at a temperature less than 66.5 K, preferably less than 62.0 K, more preferably less than or equal to 60.9 K; (d) subcooling a stream of liquid oxygen via indirect heat exchange with the expanded working fluid to produce a densified liquid oxygen stream; and (e) recirculating the warmed refrigeration stream to the compressor, wherein the warmed refrigeration stream is compressed as the working fluid to form a closed-loop refrigeration cycle.

In some embodiments of the present systems and methods the compressor is a cold compressor configured to receive the working fluid at a temperature of between about 65 K and 80 K and a pressure just above ambient pressure at the inlet. Other embodiments contemplate a warmer compressor configured to receive the working fluid at a temperature of between about 100 K and 310 K and a pressure just above ambient pressure at the inlet. Where warmer compression is contemplated, the working fluid may be required to be further warmed in the heat exchanger or a recuperator upon exiting the oxygen chiller/cooler prior to it being directed to the inlet of the compressor. Use of the recuperator either as a stand-alone heat exchanger or as an integrated part of the main heat exchanger is also preferred in the JT based closed loop refrigeration cycle.

The working fluid is preferably selected from the following mixtures: (i) a mixture of neon with nitrogen; (ii) a mixture of neon with oxygen; (iii) a mixture of neon with nitrogen and oxygen; (iv) a mixture of helium with nitrogen; (v) a mixture of helium with oxygen; (vi) a mixture of helium with nitrogen and oxygen; or (vii) a mixture of neon and helium with nitrogen and/or oxygen.

In the JT based refrigeration cycles, the JT expansion valve is preferably configured such that the expanded working fluid exiting the JT expansion valve is between about 15 mol % to about 30 mol % liquid, whereas in the turbine based refrigeration cycles, the expanded working fluid exiting the turbine is preferably between about 5 mol % to about 10 mol % liquid.

BRIEF DESCRIPTION OF THE DRAWINGS

While the specification concludes with claims specifically pointing out the subject matter that Applicant regards as his invention, it is believed that the invention will be better understood when taken in connection with the accompanying drawings in which:

DETAILED DESCRIPTION

The present system and method for densifying liquid oxygen employs a low temperature, closed-loop refrigeration circuit that includes a refrigerant or working fluid comprising a mixture of neon or helium together with nitrogen and/or oxygen. This closed-loop refrigeration circuit can be configured as a supplemental refrigeration system coupled to an existing densification system or may be a stand-alone refrigeration system. In either arrangement, the closed-loop refrigeration system is sized to reduce the time it takes for liquid oxygen densification and reach the target temperature.

As described in more detail below, the low temperature, closed-loop refrigeration system may include a turbine based refrigeration circuit with cold compression or warm compression. Alternatively, the low temperature, closed-loop refrigeration system may include a JT expansion valve based refrigeration circuit with cold compression or warm compression.

The closed-loop turbine based refrigeration cycles are more power efficient but have higher capital costs than the closed-loop JT expansion valve based refrigeration cycles. In addition, the turbine based refrigeration cycles present a technical challenge with respect to liquid forming within the turbine or upstream of the turbine which can be addressed by the selection of the proper refrigerant or working fluid mixture. The JT expansion valve based refrigeration cycles on the other hand are lower in capital costs but present higher operating costs (i.e. power costs) and higher liquid nitrogen consumption. Advantageously, the JT expansion valve refrigeration cycles are also more tolerable of different refrigerant or working fluid mixtures.

The refrigerant or working fluid in the low temperature, closed loop refrigeration cycles described herein are preferably: (i) a mixture of neon with nitrogen; (ii) a mixture of neon with oxygen; (iii) a mixture of neon with nitrogen and oxygen; (iv) a mixture of helium with nitrogen; (v) a mixture of helium with oxygen; (vi) a mixture of helium with nitrogen and oxygen; or (vii) a mixture of neon and helium with nitrogen and/or oxygen.

For the working fluids described above, use of nitrogen would be much preferred compared to the use of oxygen in combination with neon or helium because it becomes two phase at a lower temperature (boiling point of nitrogen is 77.4 K and boiling point of oxygen is 90.2 K). In the turbine based refrigeration cycles described below with reference to FIGS. 1 and 2, this means that the desired cold end temperature can be achieved without liquid formation upstream of the turbine or within the turbine nozzles, before the impeller. When significant amounts of oxygen are included in the mixture it can become difficult to avoid liquid formation in these locations. As a result, a higher pressure ratio turbine may be needed, or a turbine technology that can accept liquid formation early in its expansion process.

The problem with a working fluid of a mixture of only nitrogen with neon or helium is the likelihood of the working fluid forming a solid phase at cold end temperatures. To mitigate the problem of solid phase formation in a closed loop refrigeration cycle, some amount of oxygen in the working fluid may be preferred or even required.

Turbine Based Refrigeration Cycles

Figure 1:
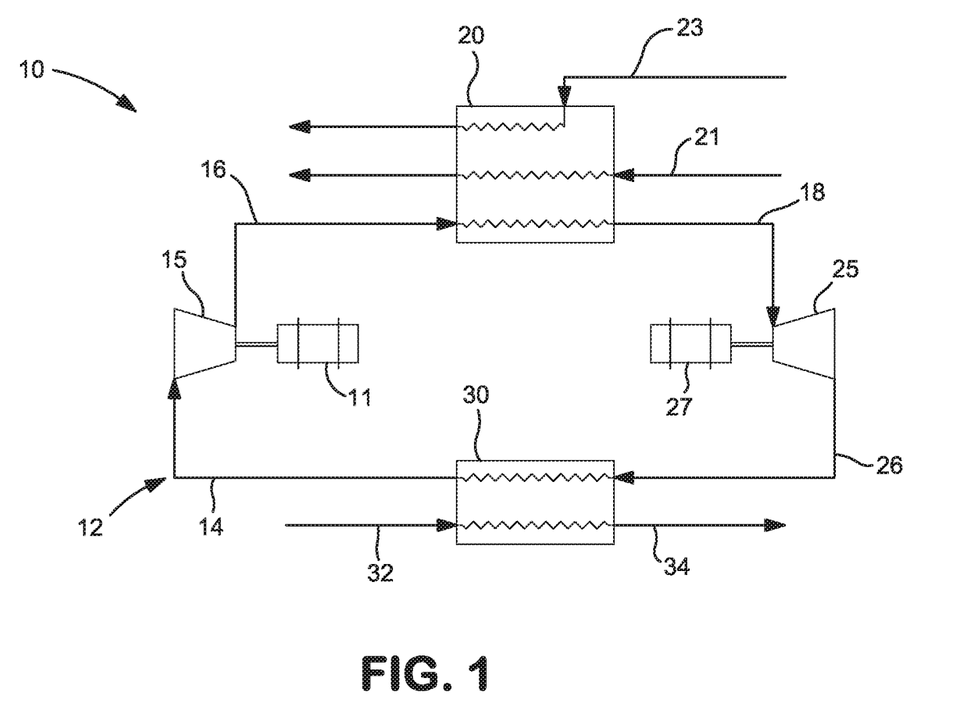
FIG. 1 is a schematic flow sheet of a turbine based refrigeration cycle for liquid oxygen densification with cold compression in accordance with one embodiment of the invention.

FIG. 1 shows a turbine based refrigeration cycle 10 configured to densify a stream of liquid oxygen 32. The working fluid (i.e. streams 14,16,18,26) preferably contains between 5 mol % and 15 mol % nitrogen and/or oxygen in either neon or helium. This working fluid circulates through the closed loop refrigeration circuit 12. The cold compressor 15 raises the pressure of the working fluid, which is preferably just above atmospheric pressure, by a pressure ratio of about 10.0. For example, a working fluid stream 14 fed to the cold compressor 15 at a pressure of about 15.2 psia would be compressed and form a compressed working fluid stream 16 at a pressure of about 152 psia (e.g. 150 psia to 155 psia). Operating the cold compressor 15 at a compressor pressure ratio of about 10.0 allows the turbine pressure ratio to approach 10.0, which is about the maximum pressure ratio that current designs of radial inflow turbines can operate efficiently. In the illustrated embodiments, the compressor 25 is shown as a motor 11 driven compressor 15 while the turbine is operatively coupled to a generator 27.

After cold compression, the compressed working fluid stream 16 is warmer, but still at a temperature that is preferably below ambient temperature. This compressed working fluid stream 16 is then cooled to near 80 K in the main cooler heat exchanger 20 by indirect heat exchange with a stream of liquid nitrogen 21 in addition to any cold gas nitrogen stream 23 that may be available at the facility/site. The cold, compressed working fluid 18 is then expanded across the turbine 25 to produce a cold working fluid exhaust stream 26 at a pressure just above ambient pressure. The exhaust stream 26 from the turbine 25 is also partially condensed to between about 5 mol % to about 10 mol % liquid, depending on the amount of nitrogen and/or oxygen in the working fluid and the operating conditions of the turbine 25. The cold turbine exhaust stream 26 is then passed through an oxygen chiller heat exchanger 30, where the influent liquid oxygen stream 32 is cooled and densified by indirect heat exchange with the cold working fluid exhaust stream 26. In this manner, the densified liquid oxygen stream 34 is chilled to a temperature less than 66.5 K, preferably less than 62.0 K, more preferably less than or equal to 60.9 K. The circulating working fluid 14 is warmed in the oxygen chiller to a slightly superheated state, preferably to a temperature between about 60 K and about 75 K and at a pressure just above atmospheric pressure Less nitrogen and/or oxygen and more neon or helium in the recirculating working fluid within the closed loop refrigeration circuit 12 enables cooling of the liquid oxygen to lower temperatures. The benefit of the heavier components (i.e. nitrogen and/or oxygen) is to provide latent heat in the oxygen chiller heat exchanger 30. In other words, less nitrogen and/or oxygen concentrations in the recirculating working fluid would require a greater recirculating flow and therefore greater power consumption to achieve the desired densification.

The viability of the turbine based refrigeration cycle 10 for liquid oxygen densification with cold compression as shown in the embodiment of FIG. 1, very much depends on the flow and temperature of the available cold gas nitrogen. The primary benefit of the turbine based refrigeration cycle 10 for liquid oxygen densification with cold compression is reduced power consumption compared to a similar arrangement with warm compression. However, if too much liquid nitrogen is required to assist in the indirect heat transfer in the main cooler heat exchanger 20, it may not be economical to use the cold compression arrangement to achieve the desired liquid oxygen densification. Currently, most liquid oxygen densification systems use sub-atmospheric liquid nitrogen to cool the oxygen. Cold gas nitrogen may be available as an otherwise vented stream from these systems when this closed-loop system is supplied for supplemental cooling.

Figure 2:
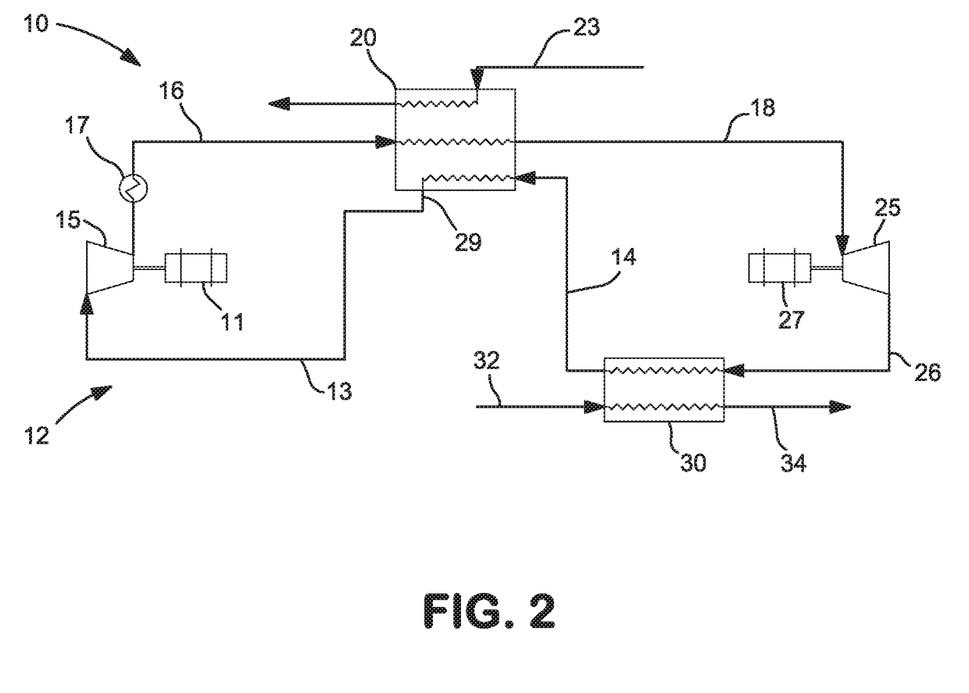
FIG. 2 is a schematic flow sheet of a turbine based refrigeration cycle for liquid oxygen densification with warm compression in accordance with another embodiment of the invention.

FIG. 2 shows an alternative embodiment that utilizes warmer compression in lieu of the cold compression arrangement shown in FIG. 1. While many of the features and descriptions of the embodiment of FIG. 1 are similar to the embodiment of FIG. 2, for the sake of brevity such similar descriptions will not be repeated. Rather, the following discussion will focus on the differences between the embodiments of FIG. 1 and FIG. 2.

In the embodiment shown in FIG. 2, the warmed, working fluid 14 exiting the oxygen chiller heat exchanger 30 is further warmed via indirect heat exchange in the main cooler heat exchanger 20 thereby providing the necessary cooling of the compressed working fluid 16 prior to its feed to the turbine 25. Preferably, the further warmed refrigerant stream 13 remains below ambient temperature exiting the main cooler heat exchanger 20. However, this will only be possible if cold nitrogen gas 23 is available. If so, it will warm due to the heat of compression so that it requires cooling in an aftercooler 17 upon exit of the compressor 15, and/or intercooling between some of the stages of compression in a multi-stage compressor system.

In the warmer compression embodiment of FIG. 2, a source of liquid nitrogen for supplemental refrigeration in the main cooler heat exchanger is not needed as in the cold compression embodiment of FIG. 1. The turbine generates enough refrigeration to cool the oxygen and sustain the system. The embodiment of FIG. 2 also shows that the further warmed working fluid stream 13 is withdrawn from the main cooler heat exchanger 20 at an intermediate location 29 before reaching the warm end of the main cooler heat exchanger, which allows the temperature to the working fluid fed to the compressor 15 or first stage of the compressor system to be lower than it would otherwise be.

Joule-Thompson (JT) Expansion Valve Based Refrigeration Cycles

Figure 3:
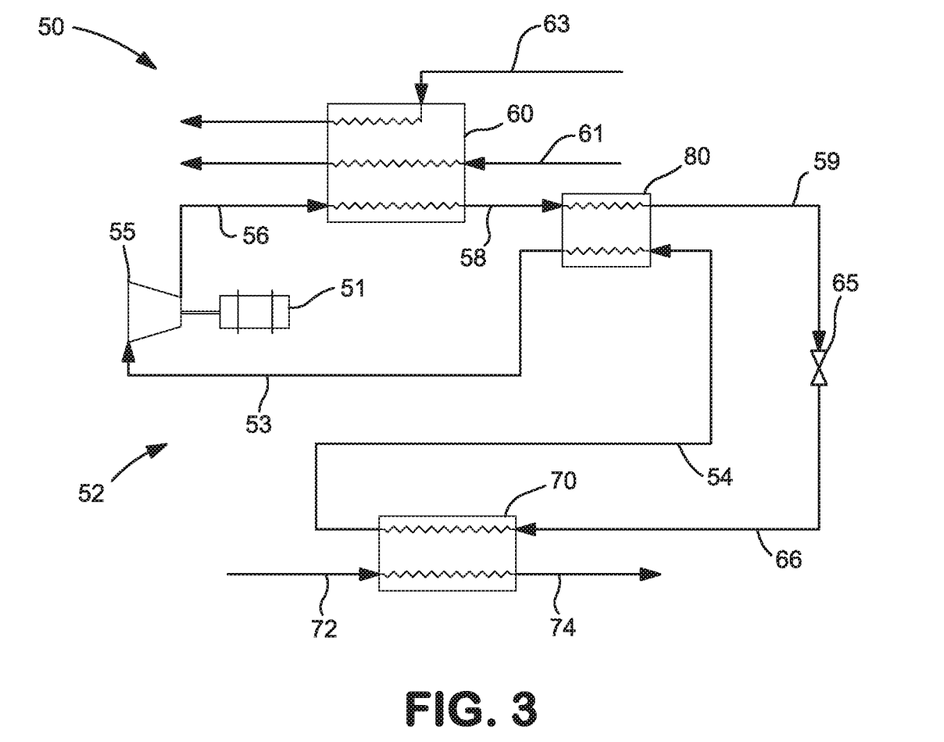
FIG. 3 is a schematic flow sheet of a Joule-Thompson (IT) expansion valve based refrigeration cycle for liquid oxygen densification with cold compression in accordance with yet another embodiment of the invention.
Figure 4:
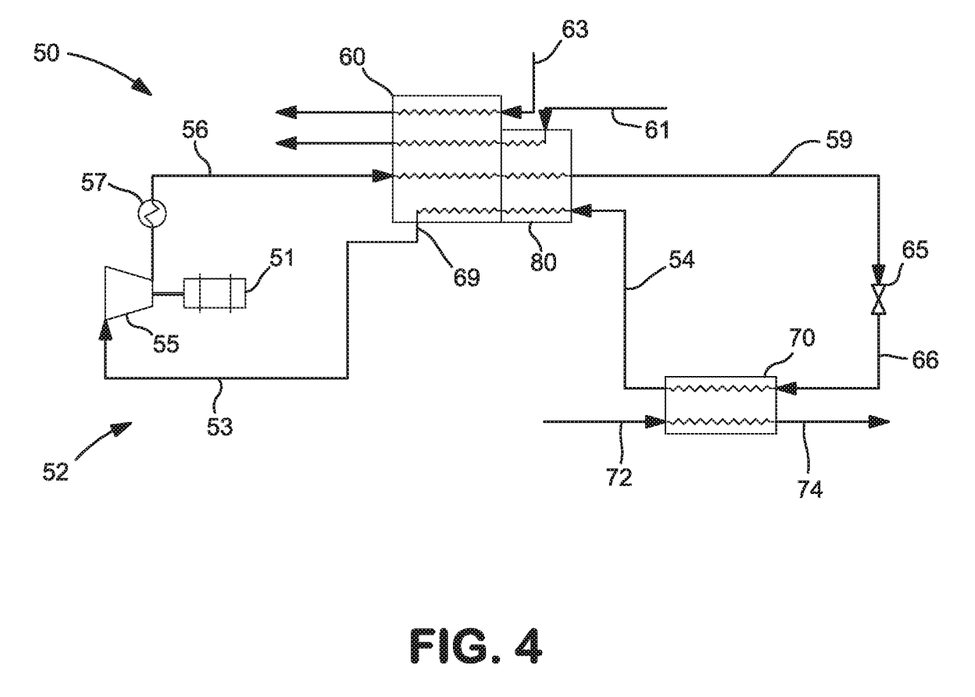
FIG. 4 is a schematic flow sheet of a Joule-Thompson (JT) expansion valve based refrigeration cycle for liquid oxygen densification with warm compression in accordance with a further embodiment of the invention.

The illustrated embodiments in FIG. 3 and FIG. 4 represent the JT expansion valve based refrigeration cycles. In the embodiment of FIG. 3 a cold compression JT expansion valve based refrigeration system 50 is shown that comprises a motor 53 driven cold compressor 55 configured to compress the refrigerant or working fluid; a main cooler heat exchanger 60 configured to cool the compressed working fluid 56; a recuperator 80 configured to provide further cooling of the cold, compressed working fluid 58; a JT throttling valve 65 used to expand the further cooled, compressed working fluid 59 and produce the refrigeration; and an oxygen chiller heat exchanger 70 to indirectly transfer the refrigeration from the expanded working fluid 66 to the liquid oxygen stream 72 for cooling and densification thus producing a densified liquid oxygen stream 74.

The cold compressor 55 is preferably a multi-stage compressor system that receives a stream of refrigerant or working fluid 53 at a sub-ambient temperature (e.g. between about 65 K and 80 K) and a pressure just above atmospheric pressure and raises the pressure of the working fluid by a ratio of between about 10.0 to 25.0. For example, if the working fluid 53 fed to the cold compressor 55 is at a pressure of about 15.2 psia, the cold compressor would compress the working fluid to a pressure between about 150.0 psia and 380.0 psia. After compression, the compressed working fluid stream 56 is warmer, but still preferably at a temperature below ambient temperature. This compressed working fluid stream 56 is then cooled to a temperature near 80 K in the main cooler heat exchanger 60 via indirect heat exchange with a stream of liquid nitrogen 61 and/or a stream of cold gaseous nitrogen 63.

Further cooling of the cold, compressed working fluid 58 to temperatures below that of the liquid nitrogen together with partial condensation is accomplished in the recuperator 80. As described in more detail below, the cooling medium in the recuperator 80 is the expanded working fluid 54. While the recuperator 80 and main cooler heat exchanger 60 are shown as separate heat exchangers, it is possible and fully contemplated that such cooling functions may be combined within a single heat exchanger.

The further cooled working fluid 59 is directed to the JT expansion valve 65 where the working fluid is expanded to produce the refrigeration. The expanded working fluid 66 exiting the JT expansion valve 65 is preferably between about 15 mol % to about 30 mol % liquid, depending on the amount of nitrogen and/or oxygen in the working fluid. Refrigeration production, in reference a JT expansion process does not extract energy from the working fluid. Refrigeration production here simply means that a colder temperature results from the JT expansion process. The cold, two-phase, expanded working fluid 66 is directed to the oxygen chiller heat exchanger 70 where it provides cooling (i.e. densification) of the liquid oxygen stream 72. As shown and described, the JT expansion valve based refrigeration cycle 50 is capable of reaching the target liquid oxygen temperature of less than 66.5 K, preferably less than 62.0 K, more preferably less than or equal to 60.9 K, and even somewhat below the target liquid oxygen temperature.

Upon exiting the oxygen chiller heat exchanger 70, the warmed working fluid 54 is directed to the recuperator 80 to provide the further cooling of the compressed working fluid 58. Upon exiting the recuperator 80, the further warmed working fluid 53 in this closed loop refrigeration system 52 is then fed back to cold compressor 55, preferably at a temperature of between about 65 K and 80 K.

The working fluid for the JT expansion valve based refrigeration cycles is preferably a mixture of neon (i.e. light component) and nitrogen and/or oxygen (i.e. heavy component). Helium may be combined with neon as another light component. The light components or neon enables cooling of the working fluid to the very cold temperatures needed. The heavy components provide latent heat in the oxygen chiller heat exchanger. In the oxygen chiller heat exchanger, liquid oxygen is cooled and densified via indirect heat exchange with the cold, expanded working fluid. Higher concentrations of the heavy components (i.e. nitrogen and/or oxygen) in the working fluid reduce the flow needed to densify the liquid oxygen and also reduces the compression power needed to compress the working fluid in the cold compressor. However, higher concentrations of the heavy components (i.e. nitrogen and/or oxygen) also limit the cold end temperatures attainable and thus the extent of liquid oxygen densification that can be achieved.

The optimal circulating refrigerant or working fluid contains between approximately 20 mol % to 30 mol % of the heavy component (i.e. nitrogen, oxygen or a combination of nitrogen and oxygen), with the remainder being the light component. Helium is much less effective than neon in the JT throttling valve refrigeration cycle because helium provides much less JT refrigeration at these temperatures. It can only be used in combination with neon, not as the sole light component.

The economic viability of the cold compression configuration shown in FIG. 3 depends on the flow and temperature of the available cold gas nitrogen. The primary benefit of cold compression is the reduced power consumption compared to a warm compression arrangement, shown in FIG. 4. Supplemental liquid nitrogen is preferably used in addition to the cold gaseous nitrogen to cool the compressed working fluid. However, if too much liquid nitrogen is required to assist in the main cooler heat exchanger in reaching the desired temperatures, it will not be economical to use the cold compression arrangement.

FIG. 4 shows an alternative embodiment of the closed-loop JT expansion valve based refrigeration system 50 that utilizes warmer compression in lieu of the cold compression arrangement shown in FIG. 3. While many of the features and descriptions of the embodiment shown in FIG. 3 are similar to the embodiment shown in FIG. 4, for the sake of brevity such descriptions will not be repeated. Rather, the following discussion will focus on the differences between the embodiments of FIG. 3 and FIG. 4.

In the embodiment of FIG. 4 a warmer compression JT expansion valve based refrigeration system 50 is shown that comprises a motor 51 driven compressor 55 configured to compress the refrigerant or working fluid 53; a combined recuperator and main cooler heat exchanger 60,80 configured to cool the compressed working fluid 56; a JT throttling valve 65 used to expand the working fluid and produce the refrigeration; and an oxygen chiller heat exchanger 70 to indirectly transfer the refrigeration from the expanded working fluid 66 to the liquid oxygen stream 72 for cooling and densification and produce a densified liquid oxygen stream 74. The compressor 55 is preferably a multi-stage compressor system that receives a stream of refrigerant or working fluid 53 at a pressure just above atmospheric pressure and a sub-ambient temperature, although warmer than the corresponding stream in the earlier described cold compressor embodiments. Depending on the availability of cold gas nitrogen and cost of liquid nitrogen, the working fluid may alternatively be supplied at ambient temperature. Similar to the cold compression embodiment, the pressure ratio across the compressor 55 is also between about 10.0 and 25.0.

The compressed working fluid stream 56 is then cooled to a temperature again near 80 K in the combined recuperator and main cooler heat exchanger 60,80 via indirect heat exchange with a stream of liquid nitrogen 61 and/or a stream of cold gaseous nitrogen 63 and the returning warmed working fluid 54. Liquid nitrogen will still be required to achieve the desired level of cooling of the compressed working fluid 56 in the combined recuperator and main cooler heat exchanger 60,80 although the demand for liquid nitrogen will be much lower than in the cold compression embodiment of FIG. 3.

In the embodiment shown in FIG. 4, the warmed, working fluid exiting the oxygen chiller heat exchanger 70 is further warmed via indirect heat exchange in the combined recuperator and main cooler heat exchanger 60,80 thereby providing the necessary cooling of the compressed working fluid 59 prior to expansion in the JT throttling valve 65. The further warmed, expanded working fluid 53 may remain below ambient temperature exiting the combined recuperator and main cooler heat exchanger 60,80. If so, it will warm due to the heat of compression so that it requires cooling in an aftercooler 57 upon exit of the motor 51 driven compressor 55, and/or intercooling between some of the stages of compression in a multi-stage compressor system.

The embodiment of FIG. 4 also shows that the further warmed working fluid stream is withdrawn from the combined recuperator and main cooler heat exchanger 60,80 at an intermediate location 69 before reaching the warm end of the heat exchanger, which allows the temperature to the working fluid fed to the compressor 55 or first stage of the compressor system to be lower than it would otherwise be. Alternatively, the working fluid fed to the first stage of the compressor system could be withdrawn at the warm end (approximately ambient temperature). Due to the warmer temperature of the working fluid at the inlet of the compressor, the power consumption of this version is significantly higher than that of the cold compression refrigeration cycle discussed above with reference to FIG. 3.

While the present invention has been described with reference to a preferred embodiment or embodiments, it is understood that numerous additions, changes and omissions can be made without departing from the spirit and scope of the present invention as set forth in the appended claims.

For example, operation of the closed-loop refrigeration cycles at sub-atmospheric low end pressures instead of pressures just above ambient pressures would be helpful from a thermodynamic point of view, especially when oxygen is contained in the refrigerant or working fluid mixtures. Combining the features of sub-atmospheric low end pressures with higher turbine pressure ratios, would enable the refrigeration system to reach the subcooling temperature without the higher saturation temperature that would otherwise be required at the high pressure ratio.

Another means of achieving the desired low end temperature would have the cold, compressed feed stream to the turbine being nearly at a saturated vapor point, such that liquid is formed early in the turbine expansion process, or perhaps even with a small amount of liquid already present in the cold, compressed feed stream to the turbine. Employing this feature or variation to the cold, compressed feed stream to the turbine may however require advanced turbine technologies.

A further variation is the inclusion of a turbine in addition to the JT expansion valve. In this contemplated arrangement, a portion of the working fluid stream could be withdrawn from the main cooler heat exchanger at an intermediate temperature and directed to a turbine where it is exhausted at or below the liquid nitrogen temperature. In this way, the liquid nitrogen usage could be reduced or eliminated.

What is claimed is:

1. A closed-loop refrigeration system for liquid oxygen densification comprising:
   a compressor having an inlet and an outlet and configured to receive a working fluid at the inlet and compress the working fluid at a pressure ratio between the inlet and outlet of between 10 and 25;
   a heat exchanger in fluid communication with the outlet of the compressor configured to receive the compressed working fluid and cool the compressed working fluid via indirect heat exchange with a gaseous nitrogen stream and a liquid nitrogen stream to produce a cold, compressed working fluid;
   a Joule-Thompson expansion valve in fluid communication with the heat exchanger and configured to expand the cold, compressed working fluid and produce a refrigeration stream of expanded working fluid;
   an oxygen chiller in fluid communication with the Joule-Thompson expansion valve, the oxygen chiller configured to receive a stream of liquid oxygen and the refrigeration stream from the Joule-Thompson expansion valve, and subcool the stream of liquid oxygen to a temperature less than 66.5 K via indirect heat exchange with the refrigeration stream of expanded working fluid to produce a densified liquid oxygen stream; and
   a recirculating conduit connecting the oxygen chiller with the heat exchanger and the inlet of the compressor, the recirculating conduit configured to recirculate the warmed refrigeration stream first to the heat exchanger where the warmed refrigeration stream further cools the compressed working fluid and then to the inlet of the compressor where the warmed refrigeration stream is compressed as the working fluid.

2. The closed-loop refrigeration system of claim 1, wherein the compressor is a cold compressor configured to receive the working fluid at a temperature of between 65K and 80K and a pressure above ambient pressure at the inlet.

3. The closed-loop refrigeration system of claim 1, wherein the working fluid from the oxygen chiller is warmed via indirect heat exchange against the cooling working fluid from the compressor and the compressor is a warm compressor configured to receive the working fluid at a temperature of between 100K and 310K and a pressure above ambient pressure at the inlet.

4. The closed-loop refrigeration system of claim 1, wherein the working fluid is selected from the group essentially consisting of: (i) a mixture of neon with nitrogen; (ii) a mixture of neon with oxygen; (iii) a mixture of neon with nitrogen and oxygen; (iv) a mixture of helium with nitrogen; (v) a mixture of helium with oxygen; (vi) a mixture of helium with nitrogen and oxygen; or (vii) a mixture of neon and helium with nitrogen and/or oxygen.

5. The closed-loop refrigeration system of claim 4, wherein the working fluid is a mixture of neon with nitrogen and oxygen.

6. The closed-loop refrigeration system of claim 4, wherein the working fluid comprises between 20 mol % and 30 mol % of nitrogen, oxygen or a combination of nitrogen and oxygen.

7. The closed-loop refrigeration system of claim 4, wherein the Joule-Thompson expansion valve is configured such that the expanded working fluid exiting the Joule-Thompson expansion valve is between 15 mol % to 30 mol % liquid.

8. The closed-loop refrigeration system of claim 1, wherein the heat exchanger comprises:
   a main heat exchanger in fluid communication with the outlet of the compressor configured to receive the compressed working fluid and cool the compressed working fluid via indirect heat exchange with the gaseous nitrogen stream or the liquid nitrogen stream or both to produce the cold, compressed working fluid; and
   a recuperator disposed downstream of the main heat exchanger and upstream of Joule Thompson expansion valve and configured to further cool the cooled, compressed working fluid via indirect heat exchange with the warm the warmed refrigeration stream exiting the oxygen chiller;
   wherein the recuperator is further configured to direct the further warmed refrigeration stream to the inlet of the compressor.

9. A method of densifying a liquid oxygen stream in a closed-loop refrigeration cycle, the method comprising the steps of:
   compressing a working fluid having between 70 mol % and 80 mol % neon or neon and helium and between 20 mol % and 30 mol % nitrogen and/or oxygen in a multistage compressor from a pressure above ambient pressure to a pressure between 150 psia and 380 psia;
   cooling the compressed working fluid via indirect heat exchange with a gaseous nitrogen stream or a liquid nitrogen stream or both to produce a cold, compressed working fluid;
   expanding the cold, compressed working fluid in a Joule-Thompson expansion valve to produce a refrigeration stream of expanded working fluid at a temperature of less than 66.5 K;
   subcooling a stream of liquid oxygen via indirect heat exchange with the refrigeration stream of expanded working fluid to produce a densified liquid oxygen stream; and recirculating the warmed refrigeration stream to the multi-stage compressor;

wherein the warmed refrigeration stream is compressed as the working fluid to form a closed-loop refrigeration cycle.

\* \* \* \* \*